United States Patent Office 2,806,530
Patented Sept. 17, 1957

2,806,530
METHOD FOR CEMENTING WELLS

George W. Binkley, Houston, Tex., assignor, by mesne assignments, to Esso Research and Engineering Company, Elizabeth, N. J., a corporation of Delaware No Drawing. Application November 7, 1955,
Serial No. 545,548

11 Claims. (Cl. 166—29)

The present invention is directed to a method for cementing wells. More particularly, the invention is directed to a method for accelerating strength development of cement employed in well cementing operations. In its more specific aspects, the invention is concerned with the cementing of wells in which the cement develops high early strength.

The present invention may be briefly described as a method for accelerating strength development of cements employed in well completion operations in which a fluid cement or a cement slurry is deposited in the well to form a cement filter cake and excess fluid cement removed from the well, the particular feature of the invention being contacting the cement filter cake with an aqueous solution of a treating agent selected from the group of consisting of ammonium chloride, ammonium carbonate, alkali metal hydroxides, alkali metal sulfates, alkali metal carbonates, alkali metal silicates, and hydrochloric acid and then applying pressure to the solution to force at least a portion of the solution through the cement filter cake to cause the filter cake to set and develop early strength.

The aqueous solution employed in the practice of the present invention may suitably be an aqueous solution of the treating agent containing at least about 1% by weight of the treating agent. Suitably the aqueous solution may contain from about 2% to about 40% by weight with a preferred range being from about 5% to about 20% by weight of the treating agent with the exception that when the treating agent is hydrochloric acid a suitable range is from about 1% to about 5%.

The treating agent is selected from a large group of suitable treating agents and includes ammonium chloride, ammonium carbonate, sodium hydroxide, potassium hydroxide, lithium hydroxide, sodium sulfate, potassium sulfate, lithium sulfate, sodium carbonate, potassium carbonate, lithium carbonate, sodium silicate, potassium silicate, lithium silicate and hydrochloric acid. As mentioned supra, usually an amount in the range from about 1% to about 40% by weight of the treating agent is employed as an aqueous solution. When hydrochloric acid is used, however, an amount in the range from about 1% to about 5% is suitably used.

The aqueous solution of treating agent is contacted with the cement filter cake and held under pressure in contact with the cement filter cake for a time of about 1 hour and for a time in the range from about 1 hour to about 24 hours, the preferred time being in the range from about 3 to about 18 hours. Satisfactory results may be obtained at times from about 4 to about 12 hours.

The pressure employed to force the aqueous solution of treating agent through the filter cake may suitably be a sufficient amount of pressure to force at least a portion of the solution into contact with and through the filter cake. While pressures of the order of about 100 pounds per square inch are satisfactory, pressures may suitably range from about 50 pounds up to about 500 pounds.

The cements employed in the present invention may be a low fluid cement slurry which may be an aqueous slurry or an oil slurry. The fluid cement may contain bentonite and/or Bentone and may also suitably be an oil-emulsion cement. Low fluid water loss cement slurries may be treated in accordance with the present invention to obtain accelerated setting rates and strength development.

The bentonite-containing cements or those containing colloidal clay have been described in U. S. Patent 2,582,459, issued January 15, 1952, to R. A. Salathiel. Such cements may be satisfactorily set in accordance with the present invention by contacting filter cakes thereof with aqueous solutions of the treating agent.

Other fluid, low water loss cements may comprise cement slurries of Portland cement, Bentone in a filtration reducing amount, and oil. Compositions of this nature will set up when contacted with the aqueous solution of treating agent. The oil slurries of cement of the nature described may suitably employ crude petroleum and fractions thereof, such as heavy naphtha boiling from about 300° to about 600° F., kerosene, diesel oil, light lubricating oil fractions, and the like.

The cement employed in the low fluid loss cement slurries of the nature described may suitably be Portland cement but may include other cements, such as pozzolan and lime mixture, and sand and lime mixture, which may be especially useful in deep well cementing. It is anticipated that plaster of Paris and the like may be used in shallow wells and in special jobs. In oil slurries containing Bentone, the cement may be used in amounts in the range from about 50 to about 700 pounds per barrel of oil with good results being obtained in amounts ranging from about 100 to about 600 pounds per barrel of oil.

In using Bentone in the oil slurry of cement, the Bentone may be used in amounts ranging from about 2 to about 10 pounds per barrel of oil. Bentone is the reaction product of organic bases with bentonite. The reaction is a base exchange reaction and the Bentone may be prepared by treating a water slurry of high-grade sodium bentonite with one of the larger quaternary ammonium complexes, for example, the water soluble salts, such as octadecylammonium chloride or dioctadecylammonium chloride and the like. An ion exchange reaction takes place to produce a flocculated organophilic bentonite. This product, commonly called a Bentone, is recovered by filtering, washing, drying, and regrinding. A description of the Bentones may be found in Chemical Engineering, March 1952, pages 226 to 230.

It may be desirable in the practice of the present invention when using Bentone containing oil slurries of cement to use effective amounts in the range of about 3 pounds per barrel of oil or less of a solvation agent.

The solvation agent employed in the practice of the present invention is used in the sense of the solvation agent referred to in the paper "Organophilic bentonites. Swelling in organic liquids," by John W. Jordan, The Journal of Physical and Colloid Chemistry, vol. 53, No. 2, February 1949, and in the article "Organophilic bentonites II—organic liquid gels," by J. W. Jordan, B. J. Hook and C. M. Finlayson, The Journal of Physical and Colloid Chemistry, vol. 54, No. 8, November 1950. Thus as the oil and Bentone are mixed, the oil moves into the interstitial spaces of the Bentone aggregate causing the Bentone particles to swell; the principal function of the solvation agent may be to speed up the movement of the oil into the interstitial spaces. The solvation agent may suitably be an aliphatic alcohol, such as methyl alcohol, ethyl alcohol, propyl and butyl alcohols and the like. As examples of other suitable solvation agents may be mentioned ethylene glycol monomethyl ether, diethylene glycol monoethyl ether, the ketones, such as acetone, methyl ethyl ketone and other ketones of the same homologous series.

It may also be desirable under some circumstances to employ effective amounts in the range of about 1 pound per barrel of oil or less of a dispersing agent to thin the cement slurry containing Bentone and dispersing agents, such as the metallic soaps of the fatty acids as exemplified by lead naphthenate, copper stearate, lead oleate, cobalt oleate and other heavy metal salts of the fatty acids may be used. As the Bentone swells, the attraction between Bentone aggregates increases, the slurry tends to thicken and the viscosity and gel strength to increase; if this change is sufficiently large that the slurry becomes difficult to handle, it may be controlled by the introduction of a heavy metal salt of fatty acid which may be adsorbed on the Bentone-oil aggregates; thus these heavy metal salts and fatty acids act as dispersing agents in the present invention.

Other low water loss cement slurries applicable in the present invention are those comprising Portland cement, a liquid hydrocarbon of the nature described supra, a water soluble organic dispersing agent and a sufficient amount of water to provide a pumpable slurry when the components of the composition are mixed to form an oil-emulsion slurry. In forming the oil-emulsion slurry, the liquid hydrocarbon employed should have a viscosity below about 40 centipoises at 100° F. and preferably the viscosity of the hydrocarbon should be below about 10 centipoises at 100° F. In this instance, the types of the hydrocarbons mentioned supra, gasoline and kerosene as well as gas oil fractions may be employed.

The liquid hydrocarbon employed in the oil-emulsion slurries may be employed in an amount in the range between about 15 cc. and about 60 cc. per 100 grams of dry cement with a preferred amount being in the range of 20 cc. to 45 cc. per 100 grams of the dry cement.

The water soluble organic dispersing agent may suitably be selected from the class of compounds possessing calcium tolerance as illustrated by sulfonated compounds, the cation active agents, and the non-ionic agents. As examples of the sulfonated compounds may be mentioned a sulfonated phenol formaldehyde condensation product, such as disclosed in Serial No. 209,510, filed February 5, 1951, in the name of Richard A. Salathiel, now abandoned, the compounds described by Tucker in U. S. 2,141,549, dated December 27, 1938, and the compounds described by Mark in U. S. 2,141,570, dated December 27, 1938. The compounds of the Tucker patent, supra, are soluble salts of the sulfonic acids, such as aromatic sulfonic acids. Tucker discloses that these compounds are formed by causing an aromatic sulphonic acid to react with formaldehyde or its equivalent in a ratio of two moles of sulfonic acid to each mole of aldehyde. Tucker then forms the water soluble salts of these compounds such as the sodium salts. It is also contemplated that the compounds of Mark, supra, may be used such as exemplified by Mark on page 2 of his specification where he sets out the derivatives of lignin. It is intended that the organic dispersing agent will include all of the compounds mentioned by Mark and Tucker, supra.

It is also contemplated that the organic dispersing agent will include diethylene glycol monolaurate and polyalkylene ether alcohol. While numerous examples have been given of the organic dispersing agent, it will be clear to the skilled workman that many compounds satisfying the requirement of being calcium tolerant may be used in lieu of the specific materials enumerated above.

The organic dispersing agent of the type illustrated may be used in an amount in the range between 0.1% and 7.5% by weight based on the dry cement. A preferred amount is in the range from 0.2% to 5.0% by weight.

The water employed in oil-emulsion slurries of the type mentioned supra should be an amount sufficient to provide a pumpable slurry. An amount in the range between 50% and 120% by weight based on the dry cement will ordinarily be satisfactory with a preferred range from 60% to 90% being satisfactory.

Emulsifying agents are also suitable organic dispersing agents for use in preparing oil-emulsion slurries of the type mentioned supra. The emulsifying agents finding use in my invention are the polar, hydrophilic and lipophilic non-ionic compounds and the cationic alkyl substituted quaternary ammonium salts. These polar emulsifying compounds are of the ester, ether-alcohol, ether-ester type. As examples of the emulsifying agents finding use in the invention may be mentioned sorbitan mono-laurate, a condensation product of ethylene oxide, propylene oxide, and propylene glycol, poly-oxyethylene lauryl alcohol, polyoxyethylene octyl phenol, and the like. Also I may use cetyl trimethyl ammonium bromide as well as other alkyl substituted quaternary ammonium salts.

In practicing the present invention using a low water loss cement slurry, the slurry is pumped into the well through a tubing which extends at least to a formation or perforations in a well casing drilled in the earth's surface. The cementing operation is performed by imposing pressure on the slurry to cause the slurry to be forced at least into contact with or into the formation or into the perforations. This causes cement solids to be deposited behind the casing in contact with the formation and in the perforations of the casing by the process of controlled filtration from the slurry. Generally, in this operation the pressure inside the casing is maintained in excess of formation pressure and after at least a portion of the cement solids has been deposited in the perforations and/or against the formation or in contact therewith, excess cement slurry is removed from the well casing by so-called reverse circulation. Water is flowed down the casing or well bore and the excess fluid cement is reversed up the tubing. If desired, a tubular extension member may be lowered through the tubing or a suitable cement plug cutting tool may be employed to place and/or reverse out the cement. After the excess fluid cement has been reversed out of the well or well casing, an aqueous solution of the treating agent of the type and concentration mentioned supra is placed in the well opposite the cementing zone and contacted with the filter cake therein. Pressure at the earth's surface is applied to the aqueous solution of treating agent which causes same to be filtered or forced through the deposited cement filter cake. After an interval of time in the range from about at least 1 hour up to about 24 hours the cement filter cake has developed sufficient strength to form an impermeable seal and the well may then be reperforated or worked over by other means.

If desired, the aqueous solution of the treating agent may be replaced by another fluid and the well casing or the well reperforated as desired in the other fluid. If desired, the well may be perforated without removing the solution of treating agent. In fact, such may be a very desirable procedure.

The invention will be further illustrated by reference to the following specific examples:

A number of runs were made in which filter cakes of oil-emulsion cement were contacted with various chemicals to determine the effect thereof on the characteristics of the cement, such as strength development and filtration rate. In these runs a 90–20 oil emulsion cement slurry was prepared. The composition of the slurry was as follows:

TABLE I 500 g. Trinity Normal Portland cement
10 g. bentonite
2 g. Kembreak (calcium lignosulfonate)
450 cc. water
100 cc. kerosene Filter cakes of this cement slurry were deposited in standard API filter cells. A permeability mold was placed in each of the filter cells for the purpose of obtaining compressive strength of the hardened cement filter cakes.

After the cement filter cakes were deposited, excess fluid cement slurry was removed and replaced by a 10% solution of the chemical used as a treating agent with the exception of hydrochloric acid, which was a 2% solution. The solution was then filtered through the filter cake for a period of six hours. During the filtration, periodic measurements were made on the filtrate and after the filtration period the remaining solution was poured off, the permeability molds removed from the filter cells and the compressive strength measurement made on the cement filter cakes in the mold.

The results of these operations are shown in the following table:

tory set and strength development. In fact, it is intended that 50 lbs. strength development may be satisfactory in some instances.

In some instances, it will be seen that 4 to 6 hours may be sufficient for strength development of the cement. This is especially true, for example, for ammonium chloride, whereas longer times may be required in the range between 6 and 18 hours for the other treating agents.

A criterion to be employed in selecting a suitable treating agent will, of course, include economic availability, ease of handling and development of suitable strength of the cement while not allowing excessive filtration through the filter cake. For cements of the nature described supra, ordinarily it is desirable that the cement develop a six-hour compressive strength of about 60 pounds per square inch at 75° F. It will be desirable to develop strength in excess of 100 pounds per square inch but above about

TABLE II

*Filtration data and compressive strength build-up of 90–20 oil emulsion cements [1]*

| Chemical Accelerators (10% Solutions) | Filtration Rate—cc. | | | | | | 6 Hr. Compressive Strength, p. s. i. at 75° F. |
|---|---|---|---|---|---|---|---|
| | 1 Hr. | 2 Hrs. | 3 Hrs. | 4 Hrs. | 5 Hrs. | 6 Hrs. | |
| $CoCl_2$ | 30 | 139 | 359 | 479 | | | 60 |
| $AlCl_3$ [2] | 600 | 900 | | | | | |
| $MgCl_2$ [2] | 500+ | | | | | | |
| $NH_4Cl$ | 40 | 48 | 50 | 50 | 50 | 50 | 440 |
| $FeCl_2$ | 65 | 200 | 325 | 414 | 458 | 486 | 280 |
| $HCl$ (2%) | 49 | 64 | 81 | 93 | 97 | 99 | 60 |
| $KOH$ | 38 | 50 | 70 | 73 | 76 | 78 | 70 |
| $NaOH$ | 35 | 45 | 51 | 54 | 54 | 55 | 120 |
| $FeSO_4$ [2] | 450+ | | | | | | |
| $Na_2SO_4$ | 39 | 55 | 61 | 71 | 73 | 74 | 210 |
| $K_2SO_4$ | 42 | 75 | 95 | 109 | 113 | 118 | 160 |
| $CaCO_3$ | 48 | 87 | 112 | 139 | 153 | 165 | 25 |
| $Na_2CO_3$ | 48 | 85 | 115 | 142 | 162 | 183 | 230 |
| $(NH_4)_2CO_3$ | 47 | 83 | 113 | 134 | 147 | 159 | 60 |
| $KNO_3$ | 48 | 80 | 114 | 142 | 167 | 186 | 20 |
| $Na_2SiO_3$ | 62 | 122 | 181 | 201 | 235 | 259 | 70 |
| $H_2O$ | 40 | 70 | 100 | 110 | 155 | 181 | 20 |

[1] Composition: 500 g. Trinity Normal Portland cement, 450 cc. water, 100 cc. kerosene, 10 g. bentonite, and 2 g. Kembreak (calcium lignosulfonate).
[2] These chemicals caused cement shrinkage, and a 6-hour test could not be made.

From these results, it may be seen that ammonium chloride, sodium hydroxide, potassium hydroxide, sodium sulfate, potassium sulfate, sodium carbonate, sodium silicate, ammonium carbonate and hydrochloric acid were effective in accelerating the setting of the cement. By way of explanation, those chemicals which have high filtration rates through the cement filter cake and allow the development of cement strength less than about 60 pounds per square inch at 75° F. after six hours are not satisfactory. For example, cobalt chloride has a high filtration rate and a low strength and, therefore, would be unsatisfactory. Aluminum chloride and magnesium chloride cause cement shrinkage and a test could not be made. The calcium carbonate solution had a low filtration rate but did not develop sufficient strength to obtain a proper seal when used in well cementing operations. This is true also with potassium nitrate and water.

Actually the period of time the cement may develop strength may be within the range given and allow the obtaining of strength greatly in excess of about 60 p. s. i. at 75° after 6 hours. In other words, if a cement shows a strength development of about 60 lbs. at 75° after 6 hours, this is an indication that the cement will set satisfactorily and provide a sufficient strength and seal.

The strength development of the cement will also depend on the composition of the cement. Thus the oil-in-water emulsion cements and the so-called modified cements of the Salathiel patent supra may require different setting times within the range of the setting times given. Ordinarily a strength development of about 100 lbs. will be more satisfactory than one greater than about 60 lbs. although the lower figure does indicate a satisfactory 50 to 60 pounds per square inch may be satisfactory. Another criterion to be employed in selecting the desirable treating agent is the total filtration rate after about six hours. Ordinarily the filtration rate should not exceed about 300 cc. after 6 hours. Applying these criteria, it will be noted that ammonium chloride, 2% hydrochloric acid and potassium and sodium hydroxide, sodium and potassium sulfate, sodium carbonate, ammonium carbonate and sodium silicate give satisfactory results.

In practicing the present invention, it is important that the cement be deposited to form a cement filter cake in the perforations or against the walls of the well and it is further important that excess cement slurry be removed from the well. After the excess cement slurry has been removed, the aqueous solution of treating agent is brought into contact with the filter cake and pressure applied thereagainst to force the solution of treating agent into contact with the filter cake to accelerate the setting of the filter cake and development of early strength. In other words, in the practice of the present invention, a so-called flash setting of the cement is obtained by chemical means which allows the well to be subsequently recompleted and worked over such as by gun perforating and the like without delay.

The present invention is quite useful and is especially important in the so-called permanent type well completion operations where the tubing is set only once during the useful life of the well above the uppermost of a series of hydrocarbon productive formations, intervals, zones, sands, or strata with all subsequent workover operations, such as cementing, reperforating and producing being carried out through the tubing employing wire line tools which are lowerable through the tubing.

In the so-called permanent well completion operations, a tubing extension which is lowerable through the tubing is arranged in the lowermost portion of the tubing and supported therein to increase effectively the length of the tubing.

The invention is of particular utility because the time which heretofore has been required before reperforating is lowered by an order of magnitude of 50% to 90%.

The nature and objects of the present invention having been completely described and illustrated, what I wish to claim as new and useful and to secure by Letters Patent is:

1. A method for accelerating strength development of cements employed in well completion operations in which a low fluid loss fluid cement is deposited in the well to form an unset filter cake consisting essentially of said cement and excess fluid cement removed from the well which comprises contacting the unset cement filter cake in the well immediately after removal of said excess fluid cement with an aqueous solution of hydrochloric acid containing no more than 5% HCl and then applying pressure to said solution to force at least a portion of the solution through the cement filter cake to cause said filter cake to set and develop early strength.

2. A method in accordance with claim 1 in which the fluid cement contains bentonite.

3. A method in accordance with claim 1 in which the fluid cement is an oil-emulsion cement.

4. A method in accordance with claim 1 in which the fluid cement is an aqueous slurry.

5. A method in accordance with claim 1 in which the fluid cement is an oil slurry.

6. A method in accordance with claim 1 in which the well is provided with a perforated well casing and in which the unset filter cake is formed in the perforations in the casing.

7. A method in accordance with claim 1 in which the aqueous solution contains from about 1% to about 5% HCl.

8. A method for accelerating strength development of cements employed in well completion operations in which a low fluid loss cement slurry is deposited in the well in an excess amount which comprises applying sufficient pressure to said cement slurry to form an unset filter cake consisting essentially of said cement in contact with the wall of the well, removing excess cement slurry from the well, contacting said unset filter cake immediately after removal of said excess fluid cement with an aqueous solution of a treating reagent containing no more than 5% HCl, and then applying sufficient pressure to said solution to force at least a portion of the solution through the filter cake to cause said filter cake to set and develop early strength.

9. A method in accordance with claim 8 in which pressure is applied to the solution for a sufficient length of time from about 1 to about 24 hours.

10. A method in accordance with claim 8 in which a sufficient pressure in the range from about 50 to about 500 pounds per square inch is applied to the solution to force said portion of the solution through the unset filter cake.

11. A method in accordance with claim 8 in which pressure is applied to the solution for a sufficient length of time from about 3 to about 18 hours.

References Cited in the file of this patent

UNITED STATES PATENTS

| | | |
|---|---|---|
| 259,863 | Jewell | June 20, 1882 |
| 1,452,463 | Huber | Apr. 17, 1923 |
| 2,170,163 | Smith | Aug. 22, 1939 |
| 2,203,302 | Liberthson | June 4, 1940 |
| 2,575,599 | Silverman | Nov. 20, 1951 |
| 2,649,160 | Williams et al. | Aug. 18, 1953 |